United States Patent [19]

Duvent

[11] Patent Number: 5,467,126
[45] Date of Patent: Nov. 14, 1995

[54] THERMOGRAPHY SYSTEM WITH FULL-SCREEN DIGITAL ENLARGEMENT WITH CAMERA USING SERIES-PARALLEL SCANNING

[76] Inventor: Jean-Louis M. Duvent, Res "Les Vignes de Bures" Bât B1, 91940 Les Ulis, France

[21] Appl. No.: 805,013

[22] Filed: Oct. 21, 1985

[30] Foreign Application Priority Data

Oct. 19, 1984 [FR] France ................................. 84 16072

[51] Int. Cl.$^6$ .......................... H04N 5/33; G02B 26/10
[52] U.S. Cl. ........................ 348/164; 250/334; 348/168
[58] Field of Search .................................. 250/332, 334; 358/113, 108, 109, 140, 180, 199, 206; 350/6.8; 348/164, 167, 168

[56] References Cited

U.S. PATENT DOCUMENTS

| | | | |
|---|---|---|---|
| 3,804,976 | 4/1974 | Gard | 250/334 X |
| 3,935,381 | 1/1976 | Petrocelli et al. | 358/180 |
| 3,953,764 | 4/1976 | Miller et al. | 358/180 X |
| 4,231,066 | 10/1980 | Merchant | 358/180 |
| 4,323,776 | 4/1982 | Bridges et al. | 250/332 |
| 4,477,834 | 10/1984 | Beaumont et al. | 250/332 X |

*Primary Examiner*—Stephen C. Buczinski
*Attorney, Agent, or Firm*—Stevens, Davis, Miller & Mosher

[57] ABSTRACT

An infrared thermography system is provided which includes an infrared camera in which raster scanning is accomplished in parallel using an oscillating mirror and scanned lines of the field of view are projected onto a detection matrix including m detectors oriented in the raster direction. The signal processor receives an analog signal output of the camera and provides sequential analog signals to a display unit which displays a representation of the field of view. The system includes digital enlargement circuitry which enables an enlarged view of a portion of the field of view which contains an object of particular interest to be viewed on the display unit. The enlargement circuit controls the raster scanner to scan at a slow scan rate by causing time successive scanned lines of the field of view to be projected on the detection matrix in overlapped relationship. The analog signal from the camera is digitized to provide a series of digital signals representing a chronological succession of lines corresponding to the lines of the field of view scanned by the camera means. A line reordering circuit provides a reordered digital output of this series of digital signals output from the digitizer to provide a correct correspondence between this series of digital signals and a spatial succession order of field lines in the field of view, in order to compensate for the aforesaid overlapped relationship. Thus, the chronological succession of line data displayed by the display means correctly corresponds to the spatial succession order of the field lines in the field of view.

10 Claims, 2 Drawing Sheets

THERMOGRAPHY SYSTEM WITH FULL-SCREEN DIGITAL ENLARGEMENT WITH CAMERA USING SERIES-PARALLEL SCANNING

FIELD OF THE INVENTION

The present invention relates generally to infrared thermographic systems and specifically to improved digital enlargement means to enable viewing of an enlarged representation of a particular object of interest in a field of view.

BACKGROUND OF THE INVENTION

Infrared thermography systems are used in particular to visualize at least a portion of the countryside by means of infrared radiation in the frequency spectrum at a wavelength longer than one micron. Visualization in the infrared range can take place day or night, but is generally more useful at night when direct vision in the visible range is reduced or impossible. The spectral bands of the radiation detected by these thermographic systems correspond to atmospheric transparent windows, at wavelengths of either 3 to 5µ, or 8 to 12µ. The latter spectral band is particularly suited to thermographic systems because it is perfectly adapted to imaging bodies at ambient temperature, because a black body at 300° K has its maximum emission at about 10µ. Systems that employ optical/mechanical raster and line scanners are generally known, as discussed in *La Thermographie Infrarouge* [Infrared Thermography] by G. GAUSSORGUES, Part 7, published by Technique et Documentation II rue Lavoisier 75384 Paris Cedex of France on Dec. 2, 1980, herein incorporated by reference.

The result of an operation involving sky, land or sea horizon surveillance, by an infrared thermography system is that a fixed or moving object that is worthy of interest is detected. The camera's angle of field is of the order of only a few degrees when observation distances are of the order of 10 km. This corresponds to a very small displayed image of an object where the detected object is only of the order of a few meters in diameter. In such instances it is desirable to enlarge the image portion which contains the object and thus facilitate viewing. This is preferably accomplished by displaying the enlarged image over the entire television monitor screen using an electronic enlarger or a full-screen electronic enlarger.

Analog processing has been used for several years to move images on the screen. When the signal from the camera to the television monitor is subjected to analog processing, electronic enlargement is accomplished by expansion of scanning to visualization, i.e., by expansion by the same ratio of similarity that exists on the abscissa and ordinate axes for the electron beam in the image tube of the television monitor. The principal drawbacks of this technique are a reduction in screen luminosity and a doubling of line spacing.

Generally, it is preferable to represent the camera output signals in digital format, because this yields greater signal processing flexibility. The present invention is directed to an infrared thermography system in which the camera output signals are digitized and in which a parallel, or series-parallel, raster scanner is used. The raster scanner can be either a single raster or preferably interlaced even and odd rasters. Field scanning accomplished by infrared detector scanning, or by series scanning using a bar of several detectors, requires a line scanner which operates at a very high operating speed thus giving rise to various synchronization problems, and also requires a very fast and sensitive photodetector. In order to eliminate these technical constraints, the preferred practice is to simultaneously scan m lines of the field of view using a detection matrix having m detectors in the raster direction, thus making it possible to divide line scanner speed by m while enabling the movement of raster scanning to remain unchanged. This latter system constitutes scanning by parallel scanning, and furthermore is compatible with scanning by series scanning, with series-parallel scanning by a two-dimensional mosaic or infrared detectors moreover being of the most interest. On this subject, see the work by G. GASSORGUES, cited above, pages 244 to 248.

However, regardless of the scanning mode adopted to scan the field, signal digitization permits copying into storage. This storage capability provides the advantage of enabling an electronic digital enlarger to be realized. The storage of a network of digital points, 6-bit codes, for example, which represent a sampled image, in an image storage device, or in a raster storage device, is known. Starting with these sample points, intermediate points can be fixed by interpolation, in both the line direction and the raster direction at the same time, using filtering techniques, preferably a digital filtering technique. Filtering is even more developed than interpolation when consideration is given to the greater number of sample points in the vicinity of the image that must be recreated. The simplest filters duplicate the closest sample points, which corresponds to/cos/filtering, or interpolate only from the two closest sample points, which corresponds to increased cosine filtering. An X2 digital enlarger, for example, requires three image points to be recreated per sampling point, and an X4 digital enlarger requires 15 image points per sampling point. This latter technique mitigates the problems associated with analog electronic enlargers as discussed above, i.e., luminosity decrease and information density on the television monitor screen, but at the same time has its own drawbacks. Generally, this technique requires a large storage capacity, corresponding at a maximum to one-half the field height in the raster direction, if full-screen digital enlargement is desired. This technical problem can be resolved in part by a compromise that consists of enlarging only the portion of the field containing the object of interest, which has been previously detected with the system operating in its customary mode and toward which the camera had been oriented in advance. However, this solution is not entirely satisfactory, although generally it is preferable to achieve full-screen digital enlargement. Moreover, even assuming that full-screen digital enlargement is achieved using this latter technique along with a large-capacity storage unit, system operation is clearly not optimum because three-fourths of the information available at the camera output is still not used, and this can be represented in the form of a loss to gain equal to a signal/noise ratio of $\sqrt{4}$.

There is yet another drawback that arises in the case of interlaced raster operation, e.g., using two even and odd interlaced rasters. Prior to recreating an image by interpolation of sample points, it is necessary to store in advance all raster image information that can, in case of movement due to displacement of the camera and/or to movement of the object in the field, cause breakup in the outline of objects. It is also necessary to obtain calculated intermediate points that are relatively false because they were obtained from adjacent points from different rasters that to all intents and purposes no longer have any correlation with each other, particularly in the case of high spatial field of view frequencies. Furthermore, when operating with interlaced rasters, it is current practice to work out one vertical being sampled in each raster because the eye, which itself functions as a filter, perceives a sampling that is sufficient for the complete image, that is, in the case of interlaced rasters that can present the phenomenon of spectrum overlapping when taken individually. After regular successive interlacing as a function of time, the spectrum overlapping phenomenon disappears except for a moving scene presenting high spatial frequencies. With the known digital enlarger described above, interpolation between adjacent points is not significant because the rasters processed contain adjacent lines that are not correlated as a function of time and appear in different rasters during scanning.

SUMMARY OF THE INVENTION

In accordance with the invention, the deficiencies in the prior art are alleviated or overcome.

The present invention concerns an infrared thermography system. The system includes an infrared camera fitted with a raster scanner for parallel, or series-parallel scanning, and a line scanner to scan, point by point, by projection on a detection matrix. This matrix comprises in the raster direction a detection bar comprising a whole number m of photosensitive detectors in parallel for simultaneous scanning of a strip of m adjacent lines of the field of view. The image of the aforesaid field of view comprises juxtaposed elementary fields. The elementary fields and the detectors have a relationship of one detector per elementary field. The system also includes an electronic processor for processing the analog signal output of a camera. This processor includes at least a digitizer for the aforesaid analog signal and at least a digital-to-analog converter for converting the aforesaid signal back to analog form after it has been processed. The system further includes visualization or display means for displaying the output signal from the digital-to-analog converter on a television monitor. The infrared thermography system of the present invention also comprises digital enlargement means for operating in a digital enlarger mode.

The present invention provides a novel infrared thermography system wherein the aforesaid media for operating in the digital enlarger mode enable ruin-screen digital enlargement. The system includes control devices, sequencing devices, a buffer storage, and line reordering devices. In this system, the raster scanning is slowed by the control devices to operate slower than the known customary scanning mode by a ratio of the enlargement factor, 8, which is selected with preservation of raster scanning time, such that the images of any two scanning strips that follow each other in time and are projected on the aforesaid detectors overlap, with the spatial displacement between successive images in the form of a strip being greater than the dimension of a detector in the raster direction. The output signals from m detectors, after being placed in series digital form, are stored in the aforesaid buffer storage and readout therefrom, the capacity of the buffer storage being at least 2m lines, such that the chronological succession of the lines at the buffer storage output for recreation of the image of the field of view on the aforesaid monitor is the same as the spatial succession of the lines scanned in the field of view.

An example of an embodiment of the invention is presented at the very outset in order to establish the concept of the invention in concrete form and to reach a better understanding of the advantages provided by the invention. Thus, an even and odd interlaced raster system is provided by way of illustration. The frame system has 627 lines, 510 of which are useful or active, and includes two interlaced rasters of 255 lines each. With the system operating in its usual mode, complete pictures are produced at a frame frequency of 25 images (50 rasters) per second. Scanning is in parallel by strips of 11 lines (with m equal to 11) and 57 scans of 11 lines per image. Given these conditions, raster scanning time is 20 ms, and line scanning time is 64 µs (704 µs for a strip of 11 lines). With this system, the realization of an X2 full-screen digital enlarger requires an image storage buffer with a capacity of 255 lines comprised of two halves for storage of the information from the even and odd interdigitized rasters. The information resulting from the scanning of the other two halves of the raster is unused. Replacement of the information on the screen of the television monitor image by image is performed at the rate of one image every 40 ms. Thus, the duration of storage in the buffer is 40 ms. Operation by interlaced rasters no longer exists. Compared with the system in accordance with the invention, the buffer storage comprises only 22 lines. Practically all of the information derived from scanning is retained, as is interlaced rasters operation. The duration of storage of information is reduced to 704 µs. There also is the advantage with respect to normal operation, such as in the case of light spatial subsampling of the rasters, that this subsampling no longer exists with the X2 digital enlarger because the density of digital sampling points is doubled in each raster.

The number of lines scanned, m, is preferably odd because this ensures the same spatial distribution between the field of view lines scanned and the lines recreated on the screen of the television monitor with a constant spacing between the lines in both cases, and in order to avoid complications in the electronic processing with respect to the invention, the enlargement factors, g, are equal to two or multiples of two.

According to a preferred embodiment of the invention, the aforesaid buffer memory can comprise two equal-capacity flip-flop storage units arranged such that, alternately, one receives data while the other is being read and such that the aforesaid line reordering media act at the write-in storage address level so as to interlace cyclically m lines that follow each other spatially in the field of view and which are acquired among the lines of g successive scanning strips, each comprising m simultaneous lines, which overlap.

According to another preferred embodiment of the invention, a first rotating mirrored drum is used for line scanning, thus providing the same advantages in the line direction as those obtained in the raster direction. In this embodiment, in order to obtain a full-screen digital enlarger with an enlargement factor, g, that is entirely predetermined, the shaft of the aforesaid drum carries a second mirrored drum with the mirrors distributed at a regular angle relative to each other. The number of mirrors on the second drum is increased with respect to the number of mirrors on the first drum, in a ratio based on the predetermined enlargement factor g. The shaft is slidable along its axis to enable substitution of the second drum for the first drum to enable operation in the g enlarger mode. The rate of rotation of the second drum is reduced by half with respect to the rate of rotation of the first drum.

BRIEF DESCRIPTION OF THE DRAWINGS

A more complete appreciation of the invention and many of the attendant advantages thereof will be readily apparent from the following description and the accompanying drawings wherein.

DETAILED DESCRIPTION OF THE INVENTION

The same numbers in the figures designate similar elements with similar functions in the various figures.

Figure 1:
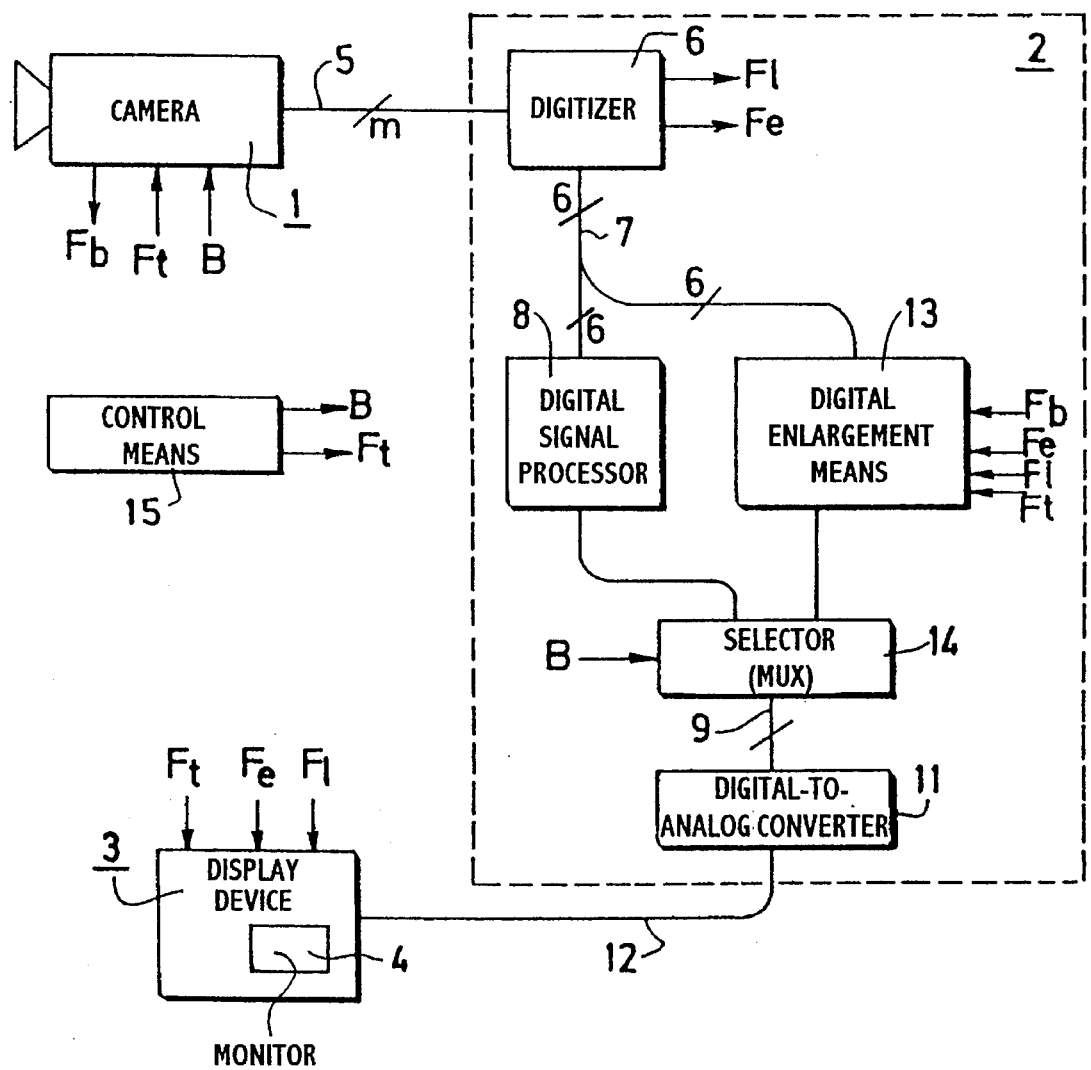
FIG. 1 is a block diagram of the infrared thermography system in accordance with the invention.

FIG. 1 shows camera 1, electronic processing module 2, and visualization media 3 on the screen of television monitor 4. Camera 1 is designed to scan infrared radiation and includes for this purpose known raster scanning and line scanning devices, which are not shown. Camera 1 preferably includes an oscillating mirror for raster scanning and a rotating mirror drum for line scanning. These optical/mechanical devices focus in the camera infrared radiation received by a detection matrix. The detection matrix comprises in the raster direction a bar of m adjacent substantially square photosensitive detectors. The dimensions of each detector are proportioned to those of an elementary field in the real instantaneous image of the field of view on the plane of the detectors, with the field of view comprising juxtaposed elementary image fields. Each detector emits an electric signal at the rate of one elementary signal per passage of an elementary field of the image in front of each detector, and this signal is transmitted to electronic processing module 2.

The only mode of interest with respect to implementation of the present invention is that of scanning by parallel (or parallel-series) scanning limited to a strip of a few adjacent lines m in the raster direction, i.e., for a value of m less than the number of lines in a raster. Given these conditions, m signals appear in parallel on m conductors, shown as one multiple conductor 5 comprising, e.g., 11 conductors, at the output of camera 1. In normal operation, the image of the field of view is projected on the detection matrix, strip of m lines after strip of m lines, such that the successive strips of the image are adjacent. If a mirror oscillating at a constant rate of rotation is used for scanning, such scanning is possible by providing a slight inclination of the scanning strips with respect to the direction of the abscissas of the field of view, this inclination being defined by angle $\alpha$ such that $$\tan \alpha = \frac{d}{X} \quad (1)$$

where d is approximately equal to the spacing of m field lines, and

X is the length of a field line.

On the other hand, this inclination will no longer appear in the recreation of the image on the screen of the television monitor, where it will be represented by a slightly deformed parallelogram of the image on the screen. It will be noted that for this deformation to be tolerable, i.e., in order to limit $\tan \alpha$ to a few percent, the value of d, and therefore of m, must be small, i.e., between a few lines and a few score lines. Values such as these favor the implementation of the invention as described below. The raster scanning described in the foregoing implies proportionality between the rate of rotation, $\omega$, of the oscillating mirror and the number m.

Electronic processing module 2 includes, in known fashion, a digitizer 6 that converts the parallel analog signal received by camera 1 into a digital series signal to provide a 6-bit output on multiple conductor 7, for example, which represents 64 possible different hues of gray. It will be noted in this regard that the multiple conductors are shown in the drawings as cut by an oblique line with the number of conductors facing. There is, for example, a line rate $f_1$ of 15625 lines per second on conductor 7 (line-scan period 64 μs), beginning with a strip rate of 11 lines of 1420.45 strips per second on conductor 5 since the period for the strip of 11 lines is 704 μs, as discussed above. In a fashion known for customary operation of an infrared thermography system, the 6-bit digital signal is transmitted to digital processor 8 which can perform various filtering or processing functions, such as concatenation, convolution, or elimination of the countryside background. After this, the digital signal is transmitted at a 6-bit rate over conductor 9 to digital-analog converter 11, which transmits a standard CCIR series analog signal to visualization or display device 3 over single conductor 12. Two successive raster scans in the camera and on the screen of the television monitor are identical in a simplified infrared thermography system, i.e., one line of a given rank of the scan corresponds to one line of the same rank of the following (or preceding) scan.

In practice, standard television interlaced scanning with even and odd lines is subsequently considered within the context of preference. In interlaced scanning, two successive rasters on the screen of the television monitor are spatially displaced with respect to each other by the height of half a raster interlace, As discussed above, according to present purposes, the total image of 510 lines, for example, comprises two successive rasters of 255 lines each. The so-called even raster is made up of the even lines and the so-called odd raster is made up of the odd lines. The odd raster is itself followed by an even raster. For customary synchronized operation of camera 1, this interlacing also is represented by a displacement of half a line between two successive raster scans as well as on the detection matrix. It is, of course, given that the lines have a height delimited by the diameter of the detector, these lines being adjacent and jointed at the time of scanning, It is noted that any one line of the image for a given scan of the field overlaps half a superior line and an inferior line of the image for the preceding or following scan; this point is clearly indicated here to provide a better understanding of the invention described hereinbelow.

The first aspect of the invention is to explore only that useful part of the field of view in the raster direction, e.g., half of the field for an X2 digital enlarger or one-fourth of the field for an X4 digital enlarger, while at the same time retaining, by preference, the raster scanning period, This makes is possible to retain in particular the operating mode of visualization media 3. These constraints are observed by reducing by one-half (or by one-quarter) the oscillation amplitude and the rotation rate of the raster scanning mirror. This line rate is reduced by increasing the line density by a factor of 2 (or 4) in the case of series scanning, and the desired digital enlarger is obtained without any other system modification. What is involved here is operation by a single raster, or by several interlaced rasters. Parallel (or parallel-series) scanning, on the other hand, is represented by an overlapping of half (or three-quarters) between strips of m lines that follow each other as a function of time during scanning, i.e., between time-successive scanned strips. This is tantamount to saying that the chronological succession of lines on conductor 7 no longer corresponds to the spatial order of succession of the field lines that these lines represent. It thus becomes necessary to put the lines that appear on conductor 7 in correct chronological order so as to obtain the correct spatial distribution on screen 4 of the television monitor. This is made possible by media 13 for operating in the digital enlarger mode in accordance with the invention. Media 13 are arranged in parallel with digital processor 8, between digitizer 6 and digital-to-analog converter 11. Media 13 also can be substituted for processor 8.

As shown in FIG. 1, a selector 14, e.g., a multiplexer with two inputs and one output, positioned directly upstream from digital-to-analog converter 11, makes it possible to select the desired digital processing for the series digital signal carried by conductor 7. When the full-screen digital enlarger mode in accordance with the invention is chosen for operation, control device 15 supplies a two-state control signal B, one being an instruction to camera 1 to operate in the fullscreen digital enlarger mode, the other being an instruction to selector 14 to pick up at its inputs the outputs of element 13.

The raster scanning mirror in camera 1 is driven in customary operation by a saw-tooth control voltage signal Vc with positive slope, centered about a reference voltage Vr with the variation in the amplitude of signal Vc being equal to 2 Vr and such that $$Vr - \Delta Vr < Vc < Vr + \Delta Vr.$$

The frequency of signal Vc, and thus the oscillation frequency of the mirror, carries the notation ft, also called the raster frequency. Signal B (see FIG. 1) preferably has the effect with respect to enlargement g, of reducing by half, for example, the slope of control signal Vc, which results in a saw-tooth signal V'c such that $$Vr - \frac{\Delta Vr}{2} < V'C < Vr + \frac{\Delta Vr}{2}$$

with frequency Ft being retained. In referring to a customary spatial order of scanning field lines, the notations for the lines being 1-3-5 . . . -509 for the odd raster and 2-4-6 . . . -510 for the even raster, the scanning lines obtained as a result of control by voltage V'c can be given the notations 127.5-128.5-129.5- . . . -381.5 voltage for the odd raster and 128-129-130- . . . -382 for the even raster, i.e., the same number of lines during the raster period with half spacing between lines for each raster. The parallel scanning mode selected is given by strips of simultaneous lines m (m being equal to, e.g., 11). The succession of lines on conductor 7, FIG. 1, is, with the notations adopted, 127.5 - 129.5 - 131.5 - . . . - 147.5 - 128.5 - 130.5 - 132.5 - . . .
- 148.5 - 149.5 - 151.5 - . . . -379.5 - 381.5 for the odd raster, and 128 - 130 - 132 - . . . - 148 - 129 - 131 - 133 - . . . - 149
150 - 152 - . . . - 380 - 382 for the even raster.

It is apparent that this chronological order no longer corresponds to the spatial order in the field of view, which is that indicated above with regard to the notations. Media 13, shown in detail in FIG. 2 in accordance with the preferred embodiment, make it possible to restore the correct order of the lines on conductor 9, i.e., to obtain the same succession of lines and rasters for the television monitor, with the succession of lines on the screen being 1 - 3 - 5 - . . . - 509 for the odd raster and 2 - 4 - 6 - . . . - 510 for the even raster. This corresponds to customary operation, or full-screen digital enlarger operation with respect to g, where g is an integer greater than 1, in preference to a single number. In practice, and in order to simplify the electronics of the digital processing accomplished by media 13, g is preferably equal to a power of 2, i.e., equal to 2, 4, or 8. Described below by way of example are media making it possible to obtain an X2 full-screen digital enlarger.

Figure 2:
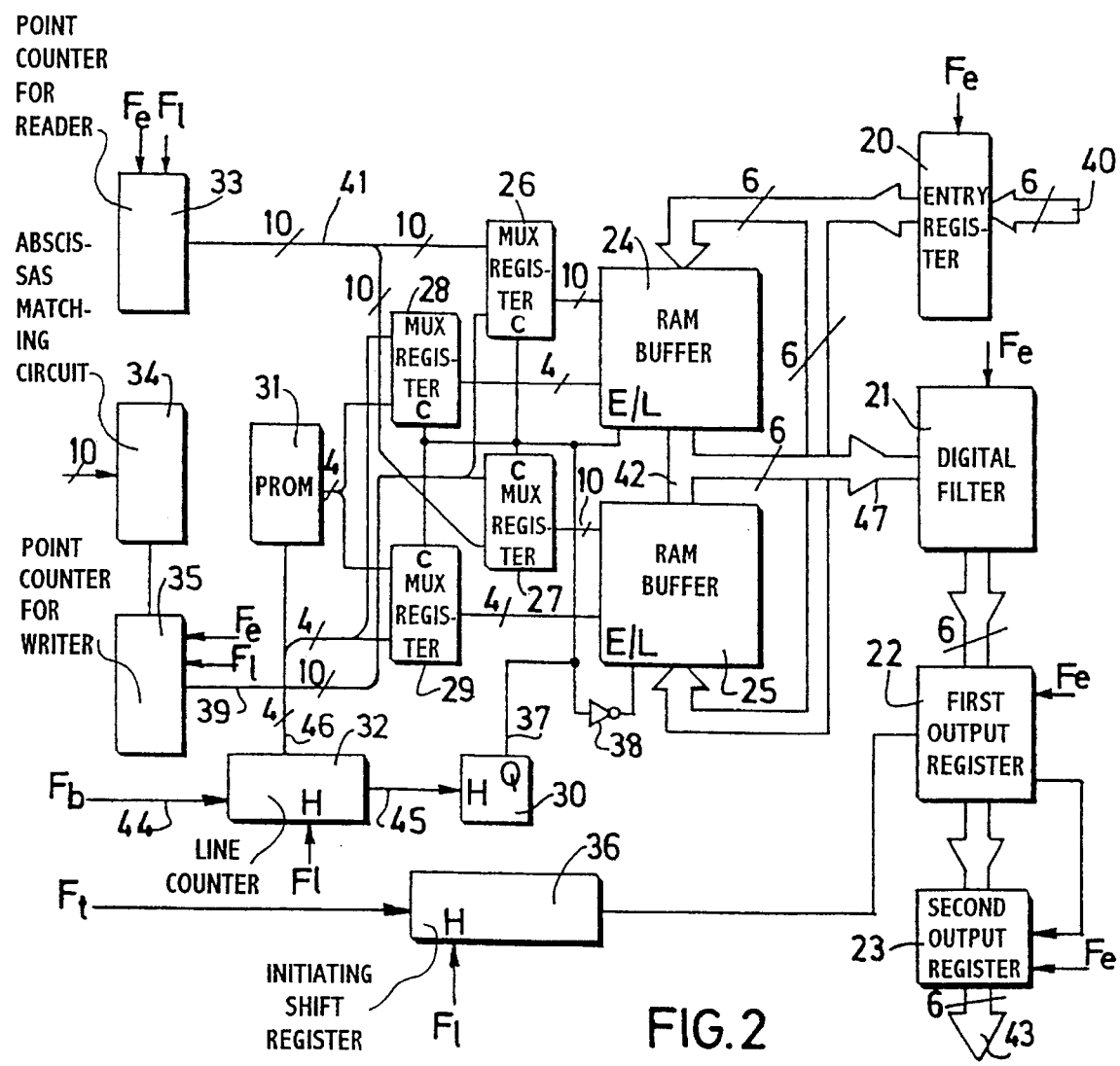
FIG. 2 is a block diagram of the electronic digital system of the infrared thermography system in accordance with the invention.

The circuit in FIG. 2 receives periodic signals: a raster blanking signal, Ft, supplied by control device 15 (see FIG. 1); a line blanking signal, Fl, and a point scanning frequency signal, Fe, both supplied by digitizer 6; and signal Fb, also called the Top strip, which is supplied by camera 1 and which marks the frequency of appearance of strips of 11 simultaneous lines during scanning. The respective frequencies and periods of these different signals, for clarification purposes, are, for example:

ft=50 Hz (Tt=20 ms);

fl=15625 Hz (Tl=64 μs);

fe=15 MHz (Te=66.7 ns);

fb=1420.4 Hz (Tb=704 ps).

The different circuits in the FIG. 2 diagram are identified as follows, from right to left and from top to bottom of the diagram:

| | |
|---|---|
| 20 | entry register |
| 21 | digital filter |
| 22 | first output register |
| 23 | second output register |
| 24, 25 | two identical random access storages operating alternately and comprising a buffer storage |
| 26, 27 | two point-selector multiplexer registers |
| 28, 29 | two line-selector multiplexer registers |
| 30 | flip-flop D |
| 31 | PROM storage |
| 32 | line counter |
| 33 | point counter for reader |
| 34 | abscissas matching circuit |
| 35 | point counter for writer |
| 36 | initiating shift register |

Commercial references to some of the circuits listed above can be as follows:

register 20 - LS 174 register 21 - two F 174 circuits plus two LS 283 circuits register 22 - LS 374 storages 24 and 25 - two times six storage units 2167 multiplexer registers 26, 27, 28, 29 - four times two LS 399 circuits

PROM 31 storage - 82 S 123 counters 33 and 35 - two times three LS 163 circuits circuit 34 - two 4174 circuits line counter 32 - 4163

The data from digitizer 6 and in series with digitizer 6, as shown in FIG. 1, appear at input 40 of the diagram in FIG. 2 in the form of 6-bits in parallel on 6 conductors for each instantaneous image scanning point. The data are transmitted to the writer inputs of storage units 24 and 25 by entry register 20, the purpose of which is to synchronize the data signals under control of signal Fe. When one storage unit is being written into, e.g., storage unit 24, the other is being read from, and vice versa, which is readily seen from the diagram since when storage unit 24 receives a given signal at its write-read input E/L, from output Q on line 37 from flip-flop D 30, storage unit 25 receives a complementary signal at its E/L input from logical NOT circuit 38. The capacity of each storage unit is equal to m lines, or, in the present embodiment wherein m=11, to only 11 lines. In customary operation (g=11), each line counts R useful or active points, or, for example, 780 points. In the electronic enlarger mode, the length of a scanned line is reduced in the same proportion as in the raster direction in order to cause the scanned scene to retain its real proportions. In other words, it is reduced in the ratio of enlargement g, the ratio of the surfaces of the same scene on the television monitor screen being as far as it is concerned equal to $g^2$ between customary operation and operation in the g enlarger mode. Generally, therefore, the recreation of a scanning line in the enlarger mode on the monitor screen is by interpolation of scanned points, for example, by duplication, repeating as many times as may be necessary, i.e., g times for each point before going on to the next point. It can be assumed, first, for simplification purposes, that this known procedure for partial scanning, followed by expansion and recreation of the parts of the scanned lines, has been used in accordance with the diagram in FIG. 2. In other words, for an X2 digital enlarger only one-half, for example the second half, of each line is taken into consideration and processed by media 13. Given these conditions, the capacity of storage units 24 and 25 is twice m lines of p/2 pixels (picture elements), that is, mp pixels. In the example chosen each pixel is stored in 6-bits. The minimum capacity here is thus 6 times 4290 bits. The availability of an integrated bitwise storage circuit makes it possible to use 6 2147 circuits of 4 K bits each on condition that use is limited to 95% of screen width, or 6 2167 circuits of 16 kilobits each. It will be noted that an X4 full-screen digital enlarger can be obtained in the same way by dividing the amplitude by 4 at the vertical scanning level, and by processing only one-fourth of each line scanned. It thus is necessary, in accordance with the invention, to store 4 times m lines of p/4 pixels in the memory, or mp pixels, which results in a storage capacity identical with that of the X2 digital enlarger.

Referring again to FIG. 2, the first aspect that will be described is that part of the circuit that concerns the writer and then the reader of the points on each line scanned that can be recreated on the monitor screen. The same signal that controls the writer in storage unit 24 is transmitted to the control input selectors 26, 27, 28 and 29, the effect of which is to select the low inputs, i.e., those shown at the bottom of the selectors in the diagram. Address bus 39 from counter 35 thus is selected to write in accordance with the successive addresses of successive points as with a FIFO type of management of storage units 24 and 25 insofar as the points are concerned. Counter 35 operates with an incremental rhythm equal to frequency fe under control of signal Fe to its clock input. In another connection, counting is initiated by abscissas matching circuit 34, which prepositions counter 35 such that after it has been zeroed by signal Fl at each instant of line change, during a predetermined number of clock periods, its outputs remain at zero, after which the outputs are increased regularly in a binary number system. The predetermined number in question for the X2 enlarger, for example, is equal to 390, and for the X4 enlarger it is equal to 585, for example. While the points on a line are entered in storage unit 24 during scanning, for example, points on another line previously stored are read out of storage 25. Under control of the signal at output 37 of flip-flop 30, the read-out addresses are those selected at the low inputs to selector 27, coming from counter 33. Counter 33, which receives signals Fe and Fl, is zeroed at each period of signal Fl at the instant of line change. The increase in the addresses on output bus 41 begins with the binary value zero at this instant, takes place in accordance with the customary numeral order, and lasts for the entire line period (ignoring the line return time or retrace on the television monitor screen) with an incremental rhythm equal to fe/2. Each pixel thus appears on data output bus 42, and, as a result, at output 43 of the media shown in FIG. 2, in the form of 6 parallel bits for a period of time equal to two point periods, represented by two identical adjacent points on a line on screen 4 of monitor 4. Each monitor line is filled by virtue of two times 390 points. When 11 lines have been processed in this manner, storage unit 24 is full and storage unit 25 has been emptied of its contents.

At this time, the condition of the output from flip-flop 30 is reversed, the effect of which is to cause storage unit 24 to enter a read mode, and storage unit 25 to enter a write mode, and to control the selection of the high inputs to multiplexer-selector registers 26, 27, 28 and 29. With respect to the processing of the points for the following 11 lines, the processing is performed exactly as described above except that the roles of storage units 24 and 25 are interchanged.

Each period of signal Fb supplied to input 44 of line counter 32 corresponds physically to the scanning of each strip of 11 field lines. Because the data representing the field lines are available in series at input 40 of the device, the beginning of each Fb period occurs simultaneously with the beginning of the first line of each strip of 11 lines. By changing the notations with respect to those adopted above for the line succession at input 40 in order to better emphasize the considerations obtained for an even or an odd raster, the result will be the following succession, for example, if line No. 1 is taken as the origin regardless of the raster considered, and if a step between the lines scanned is taken equal to 1, or if a step equal to 2 is taken between adjacent lines in a strip of 11 lines: 1 - 3 - 5 - 7 - 9 - 11 - 13 - 15 - 17 - 19 - 21 - 12 - 14 - 16 - 18 - 20 - 20 - 22 - 24 - 26 - 28 - 30 - 32 - 23 - 25 - 27 - 29 - 31 - 33 - 35 - . . . . This can be written in another way in order to cause the spatial displacement to appear

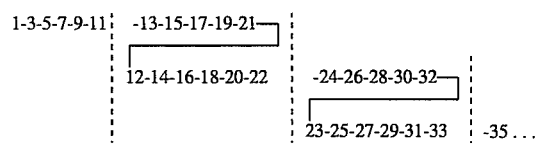

Signal Fb is synchronized with synchronized with respect to this succession of lines such that the beginning of each period coincides with the beginning of line 1, 12 23, etc., or with a succession of lines in each of storage units 24 and 25 with notations 1, 2, 3, . . . , 11. The purpose sought is to store the lines that arrive in irregular fashion in accordance with the considerations indicated above in the storage in the customary numeral order. This is possible due to three simple measures: (1) causing the addresses to progress two by two; (2) when the switch is made from one scanning strip to the next, going back to line 1 (or 2, respectively) in storage at the address bus level in the storage during the loading; and (3) switching the role of the read-write storage units after the appearance of (m+1)/2 [or (m−1)/2, respectively] first lines of each strip of m (11) lines. These three functions are performed by elements 32, 30, 31, 28 and 29 in FIG. 2. Line counter 32 is an 11 cyclical counter. It counts at the frequency of appearance of the lines because it receives the Fl signal at its clock input, and it is set such that upon the appearance of each Fb signal pulse at its input 44 (all 11 lines), a pulse appears on output conductor 45, which is connected to the clock input of flip-flop D 30 after counting (m+1)/2 [or (m−1)/2, respectively] lines. Flip-flop D 30 acts as a divide-by-two circuit, its output 37 being the seat of an alternating 1 and 0 logical state, each state being maintained for the duration of 11 lines. At the same time that the pulse appears on conductor 45, the counter passes from counting condition 11, or 1011 binary on output bus 46 to counting condition 1, or 0001 binary. As described above for the processing of points, it can be supposed, for didactic purposes, that storage unit 24 is in the write mode and storage unit 25 is in the read mode. The low inputs to the line multiplexer registers are selected. The readout is from storage unit 25 in accordance with the customary numeral order 1, 2, 3, . . . , 11 under control of address bus 46. On the other hand, the addresses coming from bus 46 and destined to be written in storage unit 24 are first transformed in accordance with the following bijective application by PROM storage 31

and which, in practice, is accomplished in binary notation. It is also possible to practice the following bijective application:

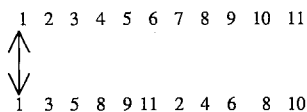

In the first case, the appearance of a pulse on conductor 45 simultaneously with counting condition 1 on bus 46 must take place at the end of time $[(m+1)/2]$ Tl after the appearance of the pulse on the conductor 44, and in the second case at the end of time $[(m-1)/2]$ Tl. What is obtained in this way is a reordering of the lines, brought about by the written addressing of storage units 24 and 25. When write-read control of storage units 24 and 25 is reversed, the write addresses of storage unit 25 come from bus 46 via PROM storage unit 31, and from the high inputs of selector 29, and the read addresses of storage unit 24 come from bus 46, unchanged, via selector 28 (high inputs). More generally, m being equal to 2P+1, the bijective applications between sets of m lines indicated above, can be written

```
1, 2, 3, . . . p, p + 1, . . . 2p + 1
2, 4, 6, . . . 2p,    1, . . . 2p + 1
and
1, 2, 3, . . . p,  p + 1, . . . 2p + 1
1, 3, 5, . . . 2p + 1, 2, . . . 2p
```

In accordance with the operation indicated in the foregoing, it will be noted that if i, i+1, and i+2 are order numbers of three successive scanning strips of m=2p+1 lines that overlap two by two by half, the lines having the notation for strip i, for example, of 1i, 2i, . . . , (2p+1)i, the order in which the lines will be put into storage by the media for reordering the lines will be the following $1_{i+1}$, $(p+2)_i$, $1_{i+1}$, $(p+3)_i$, . . . , $(2p)_i$, $P_{i+1}$, $(2p+1)_i$, $(p+1)_{i+}$ in one of the two storage units, and $1_{i+2}$, $(p+2)_{i+1}$, $2_{i+2}$, $(p+3)_{i+1}$, . . . , $(2p)_{i+1}$, $p_{i+1}$, $(2p+1)_{i+1}$, $(p+1)_{i+2}$ in the other of the two storages and so on, alternately.

It is preferred that common output data bus 47 of storage units 24 and 25 be connected to digital filter 21 which includes, in a manner not shown, a data resynchronization register controlled by signal Fe, and a circuit the function of which is to delay for one clock period (or 2Te) each bit of data that it receives and to add it to the following data bit. The bit of least weight is discarded at the output of this circuit, and this is equivalent to division by two in a binary number system. Thus, there is obtained at the output of two-coefficient digital filter 21 a point rate that is the same as the input rate, i.e., fe/2. The information contained in each point is replaced by the mean of the information contained in two adjacent points, which makes possible a smoothing of the information. Output registers 22 and 23 serve to resynchronize the data signals in known fashion. It would be possible to provide a system with just one output register, but if this were the case the first image lines on the television monitor screen would correspond to undefined information. In fact, in the embodiment described above, it is necessary, at the beginning of each raster, to store 17 (16, respectively) lines before significant information can be read out of one of the two storage units 24 and 25. The preferred approach, instead of displaying this undefined information, is to provide a white or black masking of the first lines at the top of the screen. Circuit 36 and first output register 22 are used for this purpose. Circuit 36 is a shift register that receives signal Ft at its zero reset input, and signal Fl at its clock input. Circuit 36 provides a logical signal for 17 clock pulses, derived from the zero reset pulse, such that after resynchronization via register 22, this logical signal inhibits register 23, all outputs of which as a result are at zero (or one, respectively). At the eighteenth (seventeenth, respectively) clock pulse the condition of this logical signal is reversed such that register 23 is able to transmit the information it receives.

The realization of an X2 full-screen digital enlarger makes it possible to improve the range of the system by about 20% with respect to the original image, due to the advantages described above, and further, this X2 digital enlarger provides a better image than that obtained from an image storage. It also is possible to realize an X4 or an X8 digital enlarger in accordance with the invention, but the range of the system is not further increased with respect to the X2 enlarger, it being given that the spatial sampling frequency already is amply sufficient with the X2 digital enlarger. In the case of an X4 digital enlarger, for example, the rate and amplitude of raster scanning are divided by four such that only the central fourth of the field is scanned in the raster direction under control of signal B' not shown in the figures, which is analogous to signal B (FIG. 1). Media analogous to those in the diagram in FIG. 2 must be used to process the series digital signal obtained on conductor 7, the essential differences being the following: four storage units with the same total capacity as that of the set of storage units 24 and 25 are used, one functioning in the read mode, the other three in the write mode, with the write-read reversal being made between two adjacent storage units every 11 line periods. This slightly complicates the logical portion of the circuit comprising elements 30 and 38 in FIG. 2. The conversion of addresses by analog circuit 31 in FIG. 2 also is made more complex. There are, for example, four successive scanning strips, the lines of which are numbered 1 to 11, 12 to 22, 23 to 33, and 34 to 44. The correspondence is established, for example, by PROM storage between its input and its output to the fourth of the four storage units in the write position and must be 25, 17, 9, 34, 26, 18, 10, 35, 27, 19, 11, the addresses progressing from four to four at the output, and so forth, modulo 11, for the cyclical succession of the four storage units. The write rhythm remains equal to fe, whereas the read rhythm is equal to fe/4, each point being duplicated three times in the line direction. In a similar fashion, the realization of an X8 fullscreen digital enlarger, or of one with some other multiple of two, is within the reach of one skilled in the art the specialist from the information provided in the foregoing.

The invention is not limited to enlargement values g equal to multiples of 2. It is in fact theoretically applicable to any whole value of g, but in practice is on the one hand limited to g values less than 10, and on the other hand a geometric progression of enlargements in a ratio of 2 is satisfactory and sufficient. Moreover, it is difficult to divide a frequency in electronic circuits by an integer that is not a multiple of 2. It also is conceivable that the recording of the lines scanned and digitized in buffer storage units 24 and 25 can be accomplished in accordance with their order of arrival, with reordering in the correct spatial direction being accomplished by adequate read addressing.

The present invention is of interest in particular because of its application in the raster direction, as described in the foregoing. Nevertheless, it is applicable as well in the line direction, but in a different way, given the asymmetry that exists between scanning in the raster direction and scanning in the line direction. Scanning in the line direction has not been accomplished by several detectors, the output from which would be received in parallel, but at the rate of a single signal per elementary field scanned, even when several detectors are used in the line direction. The implementation of the invention for line scanning consists in scanning one half-line at a double-point frequency, or 2fe, during each line period Tl, i.e., doubling the spatial sampling frequency. In this case the chronological succession of points on conductor 7 corresponds to the correct abscissas spatial succession and the digital processing of the signal is not affected by the introduction of this variant of the invention. Simply put, the entry of the points in storage must be made at frequency g.fe; the frequency at which the points are read remains equal to fe/g. On the other hand, this new mode of operation requires the use of another rotating mirrored drum in the case where this latter is used, and this involves adaptation of the optical/mechanical scanning part of the camera, and not only different operating control. This adaption is described in what follows with reference to FIG. 3.

Figure 3:
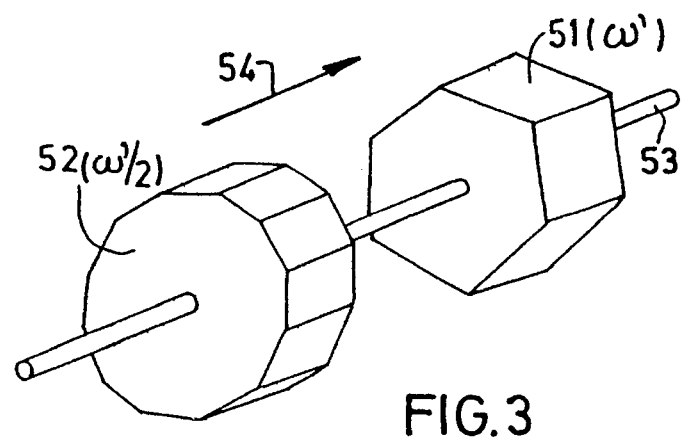
FIG. 3 shows a detail of the line scanning concept in the camera for a particular embodiment of the invention.

FIG. 3 shows in perspective a first rotating mirrored drum 51, designed for customary scanning. Drum 51 has some number of identical faces, f, with the planes of two adjacent faces being oriented at an elementary angle of 2π/f to each other, or, for example, for a drum with six faces, with 60° between adjacent faces. This elementary angle is representative of the length of each line for given optical devices located downstream. The value of the elementary angle must be halved for half the length of a scanned line; in other words, the number of faces on the rotating drum must be doubled. Moreover, the rate of rotation of second rotating mirrored drum 52 which must be substituted for the first, must be halved with respect to that of the first drum because the line rate must remain the same as when functioning in the customary manner, i.e., equal to fl. One drum can be substituted for the other, in a manner not shown, by using a small drum-like device, the shafts of the two drums being separate, or preferably, as shown in FIG. 3, with the two drums 51 and 52 being supported by and rotating on a common shaft 53. Shaft 53 can slide on its own in the direction of arrow 54 such that under the control of a signal B", not shown, drum 52 is shifted to occupy the place where drum 51 had been previously. Then, still under control of signal B" the rate of rotation of shaft 53 must change from a value ω', i.e., its customary rotation rate to a value ω'/2 or it can be changed by mechanical effect, the translation of the shaft being accompanied by a change in the gear ratio for the shaft, or by an electronic signal from the drive motor. The complementary value of signal B" makes return to customary operation possible.

In view of the above disclosure, many modifications and variations of the system will be readily apparent to one of ordinary skill in the art. The general scope of the invention extends beyond the specific examples and variants of the invention described in the foregoing. It could indeed be envisioned, at least theoretically, that unit 13 in FIG. 1 could be eliminated and the correct line order recreated within the television monitor itself. This would require modification of the vertical electronic scanning such that, for example, for an X2 enlarger, m lines would be swept with a step of two interlaces, then having arrived at a line of order m, there would be a return of m+1 interlaces, once again a sweeping of m lines with the previously cited spacing between lines, and so on until the entire monitor screen had been swept. This is very difficult, and very complex, to realize in practice because of the problems of drift and synchronization of the control voltage for the monitor's vertical scanning, and in any case because the use of a television monitor in accordance with CCITT standards is hampered, and this is not advantageous. Therefore, the present invention is not limited by the above disclosure and is limited only by the scope of the appended claims.

The embodiments of the invention in which an extensive property or privilege is claimed are defined as follows:

1. Infrared thermography system comprising:

(a) an infrared camera fitted with a raster scanner for one of (i) parallel and (ii) series-parallel scanning, and a line scanner to scan, point by point, by projection on a detection matrix comprised in the raster direction of at least a detection bar comprising a whole number of m photosensitive detectors in parallel for the simultaneous scanning of a strip of m adjacent lines of the field of view, the image of the aforesaid field of view being comprised of juxtaposed elementary fields, (b) an electronic processor of the analog signal at the output of the camera, said electronic processor being fitted with at least a digitizer for the aforesaid analog signal, and with at least a digital-to-analog converter, (c) means for visualization of the output signal from the aforesaid digital-to-analog converter on a television monitor, and (d) enlargement means for operating in a digital enlargement mode, and being characterized by the fact that said enlargement means make it possible to obtain a full-screen digital enlargement, said enlargement means comprising control devices, sequencing devices, a buffer storage, and line reordering devices, and by which, (i) the movement of the raster scanning is slowed by said control devices relative to a predetermined usual scanning mode of said raster scanner, in the ratio of the enlargement factor g, selected, with preservation of raster scanning time, such that the images of any two scanning strips that follow each other in time and are projected on the aforesaid detectors overlap, the spatial displacement between these successive images in the form of a strip being greater than the dimension of a detector in the raster direction, and (ii) the output signals from said m photosensitive detectors are, after being put in digital series form, stored in the aforesaid buffer storage and read from this latter, the capacity of which is at least 2m lines, such that the chronological succession of the lines at the storage output for reproduction of the image of the field of view on the foresaid monitor is the same as the spatial succession of the field of view lines scanned.

2. Infrared thermography system in accordance with claim 1, in which the number m is odd for the realization of an X2, X4, or X8 digital enlargement (g is equal to 2, 4, or 8).

3. Infrared thermography system in accordance with claim 1 in which line scanning is assured by a first rotating mirrored drum characterized by the fact that in order to obtain a full-screen digital enlargement with a completely predetermined enlargement factor, g, the shaft of the aforesaid first drum carries a second mirrored drum, the mirrors separated in a regular angular fashion, and the number of mirrors on which is increased in the ratio of the aforesaid predetermined enlargement factor, g, with respect to the number of mirrors on the aforesaid first drum, the aforesaid shaft being able to slide in its own direction in a manner such as to be able to substitute the first for the aforesaid second drum in order to operate in the g enlargement mode, the rate of rotation of the aforesaid second drum being reduced by g with respect to that of the first drum.

4. Infrared thermography system in accordance with claim 1 characterized by the fact that the aforesaid buffer storage is comprised of two storages of equal capacity operating such that, alternating, one receives data while the other is being read, and that the aforesaid media for reordering the lines act at the writing storage addressing level so as to interlace in a cyclical manner the m lines that follow spatially in the field of view, and which are acquired among the lines of g successive scanning strips, each comprising m simultaneous lines, which overlap.

5. Infrared thermography system in accordance with claim 4 for the realization of an X2 (g is equal to 2) digital enlarger, characterized by the fact that for three successive scanning bands designated i, i+1, and i+2, of m=2p+1 lines which overlap two by two, the lines having notations, for example, $1i, 2i, \ldots, (2p+1)\underline{i}$ for strip i, with the order in which the entry is made in the storage by the line reordering means being $1_{i+1}, (p+2)_i, 2_{i+1}, (p+3)_i, \ldots, (2p)_i, P_{i+1}, (2p+1)_i, (p+1)_{i+1}$, in one of the two storages, and $1_{i+2}, (p+2)_{i+1}, 2_{i+2}, (p+3)_{i+1}, \ldots, (2p)_{i+1}, P_{i+2}, (2p+1)_{i+1}, (p+1)_{i+2}$ in the other of the two storages.

6. An infrared thermography system, comprising:

camera means for analyzing an image of a field of view, said camera means including a line scanner and a raster scanner for scanning lines of said field of view by projecting a plurality of lines therefrom on a detection matrix comprising a detection bar oriented substantially in a raster direction of said raster scanner, said detection bar including a plurality of thermosensitive detectors in parallel for simultaneous scanning of a scanning strip of m adjacent lines of said field of view, said raster scanning having a predetermined normal scan rate, said camera means for producing an analog signal output representing said lines of said field of view, display means, responsive to sequential analog signals, for displaying at least a portion of said image, electronic processor means, responsive to said analog signal output of said camera means, for providing sequential analog signals to said display means, said electronic processor means comprising:

(a) an analog-to-digital converter means, responsive to said analog signal output of said camera means, for providing a first digital signal output comprising a series of digital signals representing a chronological succession of lines corresponding to said lines of said field of view scanned by said camera means, (b) digital enlarger means, responsive to said digital signal output from said analog-to-digital converter means, for providing a second digital signal output representing an enlarged view of a portion of said field of view, said portion of said field of view being enlarged by a factor of g with respect to a size it would have if said field of view were displayed on said display means in its entirety, said digital enlarger means comprising:

(i) control means for controlling said raster scanner to scan lines of said field of view at a predetermined slow scan rate by causing time-successive scanned lines from said field of view to be projected on said detection matrix in overlapped relationship, said predetermined slow scan rate being 1/g of said predetermined normal scan rate, and (ii) line reordering means for providing a reordered digital output of said series of digital signals output from said analog-to-digital converter means to provide a correct correspondence between said series of digital signals output from said analog to digital converter means and a spatial succession order of field lines in said field of view to compensate for said overlapped relationship, such that a chronological succession of line data displayed by said display means correctly corresponds to said spatial succession order of field lines in said field of view, and (c) a digital-to-analog converter means, responsive to said reordered digital output, for providing said sequential analog signals to said display means.

7. The system as in claim 6, wherein m is an odd integer and g is one of 2, 4, and 8.

8. The system as in claim 6, wherein said line scanner comprises a first mirrored drum, a rotatable shaft on which said first drum is mounted, a second mirrored drum mounted on said shaft in spaced relationship with said first drum, said first drum and said second drum each comprising a plurality of peripheral planar mirror faces, adjacent faces of said first drum being oriented relative to each other at a first angle and adjacent faces of said second drum being oriented relative to each other at a second angle, said second drum comprising g times the number of faces of said first drum, said shaft being slidable in a direction along its own axis to cause said line scanner to alternately use said first drum and said second drum for scanning.

9. The system as in claim 6, further comprising a buffer storage means comprising a first storage unit and a second storage unit having substantially equal storage capacity relative to one another, means for causing said first storage unit to operate in write mode while said second storage unit is operating in read mode and for causing said first storage unit to operate in read mode while said second storage unit is operating in write mode, and wherein said line reordering means comprises means for addressing said first storage unit and said second storage unit to write into said buffer storage means to cyclically interlace data representing m spatially successive lines in said field of view acquired from lines in g successive overlapped said scanning strips.

10. The system as in claim 9, wherein g=2, m=2p+1 where p is the number of active points in a said line scanned by said camera means, three successive said scanning strips being represented by i, i+1 and i+2, adjacent ones of successive said scanning strips are overlapped by one-half, lines in scanning strip i are represented by $1i, 2i, \ldots, (2p+1)i$, lines in scanning strip i+1 are represented by $1(i+1), 2(i+1), \ldots (2p+1)_{i+1}$ and lines in scanning strip i+2 are represented by $1(i+2), 2(1+2), \ldots, (2p+1)(i+2)$, said means for addressing causing data representing said lines in said three successive scanning strips to be written alternately into said first storage unit and said second storage unit in a line order comprising successively $1_{i+1}$, $(p+2)_i$, $2_{i+1}$, $(p+3)_i$, . . . , $(2P)_i$, $P_{i+1}$, $(2p+1)_i$, $(p+1)_{i+1}$, in one of said first storage unit and said second storage unit and $1_{i+2}$, $(p+2)_{i+1}$, $2_{i+2}$, $(p+3)_{i+1}$, . . . , $(2p)_{i+1}$, $P_{i+2}$, $(2p+1)_{i+1}$, $(p+1)_{i+2}$, in the other of said first storage unit and said second storage unit.

\* \* \* \* \*